(12) United States Patent
Allen et al.

(10) Patent No.: US 7,243,123 B1
(45) Date of Patent: Jul. 10, 2007

(54) VIDEO CALL ROUTING WITH PRESENCE DETERMINATION

(75) Inventors: Paul G. Allen, Mercer Island, WA (US); James A. Billmaier, Woodinville, WA (US); James H. Boyden, Seattle, WA (US); Robert E. Novak, Kirkland, WA (US); Michael Lee, Cupertino, CA (US)

(73) Assignee: Digeo, Inc., Kirkland, WA (US)

( * ) Notice: Subject to any disclaimer, the term of this patent is extended or adjusted under 35 U.S.C. 154(b) by 1067 days.

(21) Appl. No.: 10/045,672

(22) Filed: Oct. 22, 2001

(51) Int. Cl.
*G06F 15/16* (2006.01)
(52) U.S. Cl. ...................................... 709/204; 709/228
(58) Field of Classification Search ................ 709/203, 709/209, 238, 204, 228
See application file for complete search history.

(56) References Cited

U.S. PATENT DOCUMENTS

| | | | |
|---|---|---|---|
| 5,189,691 A | 2/1993 | Dunlap | 379/70 |
| 5,896,165 A | 4/1999 | Rao | 348/14 |
| 5,937,057 A * | 8/1999 | Bell et al. | 379/265.02 |
| 6,055,314 A * | 4/2000 | Spies et al. | 380/228 |
| 6,092,102 A | 7/2000 | Wagner | 340/7.29 |
| 6,167,122 A * | 12/2000 | Titmuss et al. | 379/93.15 |
| 6,243,448 B1 | 6/2001 | Corbett et al. | 379/93.35 |
| 6,363,248 B1 * | 3/2002 | Silverman | 455/417 |
| 6,518,994 B1 * | 2/2003 | Johnson et al. | 348/14.11 |
| 6,545,697 B1 * | 4/2003 | Parker et al. | 348/14.01 |
| 7,139,722 B2 * | 11/2006 | Perrella et al. | 705/9 |
| 2002/0152402 A1 * | 10/2002 | Tov et al. | 713/201 |
| 2003/0018744 A1 * | 1/2003 | Johanson et al. | 709/217 |
| 2003/0023691 A1 * | 1/2003 | Knauerhase | 709/206 |
| 2003/0025787 A1 * | 2/2003 | Stephens, Jr. | 348/14.09 |
| 2003/0046705 A1 * | 3/2003 | Sears | 725/106 |

OTHER PUBLICATIONS

OneName Corporation; XNS Technology; http://www.onename.com/pages/xns_ov.html; printed Jul. 9, 2001.
Teledotcom; Tornado Says Unified Message Is Killer; http://www.teledotcom.com/article/TEL20010620S0003; printed Jul. 9, 2001.
Bigfoot.com; Bigfoot Email Tools; http://www.bigfoot.com/RUN?FN=forwarding&locale=en...:11123&Cook=&SEQ=&ver=2.0.; printed Jun. 28, 2001.
Communicatons Convergence.com; CTI2's Extreme Universal Messaging Platform; http://www.computertelephony.com;article/CTM20000613S0023; printed Jul. 9, 2001.

* cited by examiner

*Primary Examiner*—Jason Cardone
*Assistant Examiner*—Minh-Chau Nguyen
(74) *Attorney, Agent, or Firm*—Kory D. Christensen; Stoel Rives LLP

(57) ABSTRACT

A request to establish video communication with a recipient associated with multiple communication devices is received. The recipient is identified using information contained within the request. A set of communication devices associated with the recipient is determined. A first communication device with a highest probability of being accessible to the recipient is selected from the set. The video communication request is forwarded to the first selected communication device.

34 Claims, 15 Drawing Sheets

Schedule Data
602

| Time | Location | Device | Address |
|---|---|---|---|
| 9:00am - 5:00pm | Office | Office PC | 2.4.2.1 |
| 5:00pm - 5:30pm | Commute | Cell Phone | 5.2.3.8 |
| 6:00pm - 10:00pm | Home | Home Videophone | 4.1.5.8 |
| ... | ... | ... | ... |

Usage Pattern Data
802

| Rule # | Description | Date | ... |
|---|---|---|---|
| 1 | Each weekday at 12 noon placed V-call from Office PC | 02/02/2000 | ... |
| 2 | 73 V-calls last week between 6pm and 8pm using home Videophone | 03/02/2000 | ... |
| 3 | Every wednesday at 6am V-call placed using cell phone | 04/02/2000 | ... |
| ... | ... | ... | ... |

FIG. 9

User Preference Data
1002

| Time | Day | Device | Address |
|---|---|---|---|
| 9:00am - 5:00pm | Weekdays | Office PC | 2.4.2.1 |
| 12:00am - 4:00pm | Weekdays | Cell Phone | 5.2.3.8 |
| 5:00pm - 5:30pm | Weekends | Home Videophone | 4.1.5.8 |
| 6:00pm - 10:00pm | Sept. 12-24 2001 | Cell Phone | 5.2.3.8 |
| ... | ... | ... | ... |

VIDEO CALL ROUTING WITH PRESENCE DETERMINATION

BACKGROUND

1. Field of the Invention

The present invention relates generally to the field of video communication. More specifically, the present invention relates to a system and method for routing video calls to a particular communication device of a recipient using presence determination techniques.

2. Description of Related Background Art

Devices supporting two-way video communication are becoming increasingly popular. For instance, videophones, interactive television (ITV) systems, personal computers, and other devices supporting video communication are currently available.

Often, a user may have access to a number of such devices, each having its own videophone number, identifier, or network address. For example, a user may have access to a personal computer at work, an ITV system at home, and a personal digital assistant (PDA) on his or her person, all of which have two-way video communication capability.

Thus, in order to place a video "call" to a recipient, a caller must know all of the videophone numbers, identifiers, or addresses of the recipient and guess which device is most likely to be presently accessible to the recipient. This process of guessing by the caller can be very frustrating and time consuming.

Accordingly, what is needed is a system and method for routing video calls to a communication device most likely to be presently accessible to the recipient. What is also needed is a system and method for routing video calls to one or more communication devices of a recipient using a single identifier or address.

BRIEF DESCRIPTION OF THE DRAWINGS

Non-limiting and non-exhaustive embodiments of the invention are described with reference to the figures, in which:

FIG. 7 is a table illustrating example schedule data;

FIG. 9 is a table illustrating example usage pattern data;

FIG. 11 is a table illustrating example user preference data;

DETAILED DESCRIPTION OF THE PREFERRED EMBODIMENTS

Figure 1:
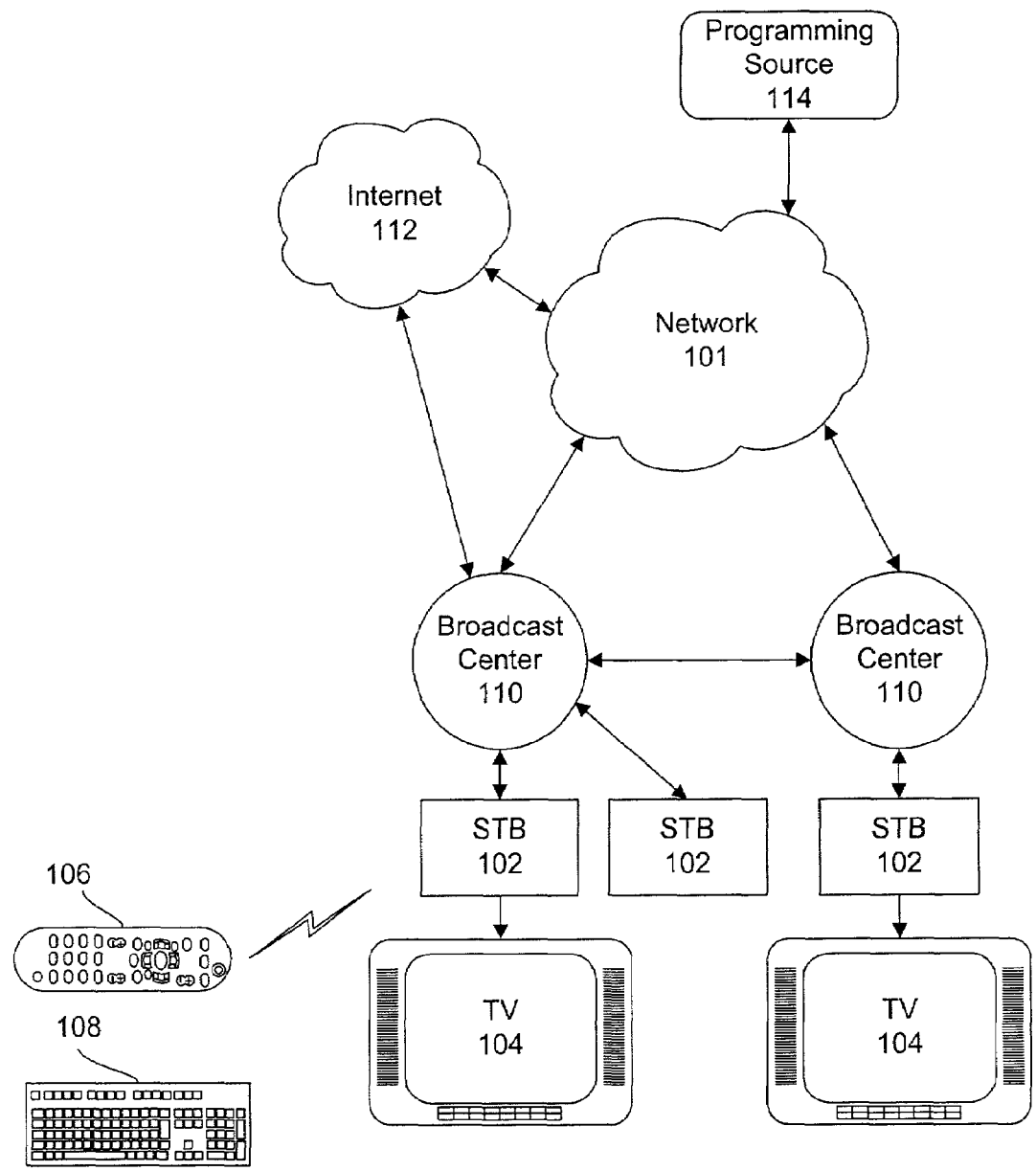
FIG. 1 is a block diagram of a communication system.

The present invention relates to a system and method for routing video calls to a particular communication device of a recipient that eliminates or substantially diminishes all of the above-identified problems and disadvantages.

In one embodiment, a request to establish video communication between a caller and a recipient is received. The request may be sent by any communication device supporting two-way video communication, such as a videophone, interactive television (ITV) system, personal computer, or the like. The request may be received, for example, by a communication node (such as a cable head-end) linking the communication devices of the caller and the recipient. The request may be embodied in any suitable format according to the communication devices and/or software being used.

In one embodiment, the recipient is identified using information contained within the request. The request may contain, for instance, the recipient's name, personal network address, or the like. In one embodiment, the request includes a universal, non-device-specific address for the recipient according to the ENUM standard.

A set of communication devices associated with the recipient is then determined. For example, a particular recipient may own or have access to a number of communication devices that support video communication, such as a videophone, ITV system, personal computer, PDA, cellular telephone, or the like. Depending on the recipient's physical location and/or other circumstances, one or more devices may be more accessible to the recipient at any given time than other devices. For example, after working hours, a user's ITV system may be more accessible the recipient than an office PC.

From the set of communication devices associated with the recipient, a device having the highest probability of being presently accessible to the recipient is selected. Selecting this device may be accomplished using a variety of techniques, factors, and/or indicators, collectively referred to herein as "presence determination."

For example, in one embodiment, the device that was last used by the recipient is selected. In an alternative embodiment, device usage pattern data and/or a recipient's daily schedule may be used to determine the device having the highest probability of being presently accessible to the recipient. In still another embodiment, a recipient may specify which device should be used to contact him or her at different times of the day or week.

In certain embodiments, each communication device may be polled to determine a recipient's presence in relation to the communication device. In other embodiments, a locator device may transmit an indication of the recipient's physical location to aid in selecting a communication device with the highest probability of being presently accessible to the recipient.

Once a communication device is selected, the request is then forwarded to the selected communication device. While the request may originally include a universal, non-device-specific address for the recipient, the request is then addressed to the particular selected device and transmitted in a suitable format using standard protocols.

If the recipient accepts the request, two-way video communication is established between the caller and the recipient using the selected communication device. If, however, the request is not accepted within an established time interval, a communication device having a next highest probability of being accessible is selected in one embodiment. The request is then forwarded to the newly selected communication device as discussed above. In some cases, a recipient may specify an order in which his or her communication devices should be selected.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

Furthermore, the described features, structures, or characteristics may be combined in any suitable manner in one or more embodiments. In the following description, numerous specific details are provided, such as examples of programming, software modules, user selections, network transactions, database queries, database structures, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

The following discussion makes particular reference to two-way video communication. However, those skilled in the art recognize that video communication usually implies audio communication. Thus, where video communication and corresponding components are specifically illustrated, audio communication and corresponding components may be implied.

Referring now to FIG. 1, there is shown a communication system 100 according to an embodiment of the invention. In one implementation, the system 100 includes a broadband communication network 101, such as a cable television network or direct satellite broadcast (DBS) network, although other networks are possible.

The system 100 may include a plurality of set top boxes (STBs) 102 located, for instance, at customer homes or offices. Generally, an STB 102 is a consumer electronics device that serves as a gateway between a customer's television 104 and the network 101. In alternative embodiments, an STB 102 may be embodied more generally as a personal computer, an advanced television 104 with STB-like functionality, or another type of customer premises equipment (CPE).

The following specification describes video communication between one or more STBs 102. However, those skilled in the art will recognize that other types of video communication devices may be used, such as dedicated videophones, personal computers, PDAs, etc.

An STB 102 receives encoded television signals and other information from the network 101 and decodes the same for display on the television 104 or other display device, such as a computer monitor. As its name implies, an STB 102 is typically located on top of, or in close proximity to, the television 104.

Each STB 102 may be distinguished from other network components by a unique identifier, number, code, or address, such as an Internet Protocol (IP) address (e.g., IPv6), a Media Access Control (MAC) address, or the like. Thus, video signals and other information may be transmitted from the network 101 to a specific STB 102 by addressing the same with the correct address, after which the network 101 routes the transmission to its destination using conventional techniques.

A remote control 106 is provided, in one configuration, for convenient remote operation of the STB 102 and the television 104. The remote control 106 may use infrared (IR), radio frequency (RF), or other wireless technologies to transmit control signals to the STB 102 and the television 104. Other remote control devices are also contemplated, such as wired or wireless mice (not shown).

Additionally, a keyboard 108 (either wireless or wired) is provided, in one embodiment, to allow a user to rapidly enter text information into the STB 102. Such text information may be used for e-mail, instant messaging (e.g. text-based chat), or the like. In various embodiments, the keyboard 108 may use IR, RF, or other wireless technologies to transmit keystroke data to the STB 102.

Each STB 102 may be coupled to the network 101 via a broadcast center 110. In the context of a cable television network, a broadcast center 110 is often referred to as a "head-end", which is generally a centrally-located facility within a community where television programming is received from a local cable TV satellite downlink or other source and packaged together for transmission to customer homes. In one configuration, a head-end also functions as a Central Office (CO) in the telecommunication industry, routing video signals and other data to and from the various STBs 102 serviced thereby.

A broadcast center 110 may also be embodied as a satellite broadcast center within a direct broadcast satellite (DBS) system. A DBS system may utilize a small 18-inch satellite dish, which is an antenna for receiving a satellite broadcast signal. Each STB 102 may include a digital integrated receiver/decoder (IRD), which separates each channel, and decompresses and translates the digital signal from the satellite dish to be displayed by the television 104.

Programming for a DBS system may be distributed, for example, by multiple high-power satellites in geosynchronous orbit, each with multiple transponders. Compression (e.g., MPEG) may be used to increase the amount of programming that can be transmitted in the available bandwidth.

The broadcast centers 110 may be used to gather programming content, ensure its digital quality, and uplink the signal to the satellites. Programming may be received by the broadcast centers 110 from content providers (CNN®, ESPN®, HBO®, TBS®, etc.) via satellite, fiber optic cable and/or special digital tape. Satellite-delivered programming is typically immediately digitized, encrypted and uplinked to the orbiting satellites. The satellites retransmit the signal back down to every earth-station, e.g., every compatible DBS system receiver dish at customers' homes and businesses.

Some broadcast programs may be recorded on digital videotape in the broadcast center 110 to be broadcast later. Before any recorded programs are viewed by customers, technicians may use post-production equipment to view and analyze each tape to ensure audio and video quality. Tapes may then be loaded into a robotic tape handling systems, and playback may be triggered by a computerized signal sent from a broadcast automation system. Back-up videotape playback equipment may ensure uninterrupted transmission at all times.

Regardless of the nature of the network 101, the broadcast centers 110 may be coupled directly to one another or through the network 101. In alternative embodiments, broadcast centers 110 may be connected via a separate network, one particular example of which is the Internet 112. The Internet 112 is a "network of networks" and is well known to those skilled in the art. Communication over the Internet 112 is accomplished using standard protocols, such as TCP/IP (Transmission Control Protocol/Internet Protocol) and the like.

A broadcast center 110 may receive television programming for distribution to the STBs 102 from one or more television programming sources 114 coupled to the network 101. Preferably, television programs are distributed in an encoded format, such as MPEG (Moving Picture Experts Group).

MPEG is a form of predictive coding. In predictive coding, how and how much a next image changes from a previous one is calculated, and codes are transmitted indicating the difference between images, rather than the image itself. In MPEG, the images or frames in a sequence are typically classified into three types: I frames, P frames, and B frames. An I frame (or intrapicture) is an image that is coded without reference to any other images. A P frame (or predicted picture) is an image that is coded relative to one other image. A B frame (or bi-directional picture) is an image that is derived from two other images, one before and one after.

Various MPEG standards are known, such as MPEG-2, MPEG-4, MPEG-7, and the like. Thus, the term "MPEG," as used herein, contemplates all MPEG standards. Moreover, other video encoding/compression standards exist other than MPEG, such as JPEG, JPEG-LS, H.261, and H.263. Accordingly, the invention should not be construed as being limited only to MPEG.

Broadcast centers 110 may be used to enable audio and video communications between STBs 102. Transmission between broadcast centers 110 may occur (i) via a direct peer-to-peer connection between broadcast centers 110, (ii) upstream from a first broadcast center 110 to the network 101 and then downstream to a second broadcast center 110, or (iii) via the Internet 112. For instance, a first STB 102 may send a video transmission upstream to a first broadcast center 110, then to a second broadcast center 110, and finally downstream to a second STB 102.

Of course, the communication system 100 illustrated in FIG. 1 is merely exemplary, and other types of devices and networks may be used within the scope of the invention.

Figure 2:
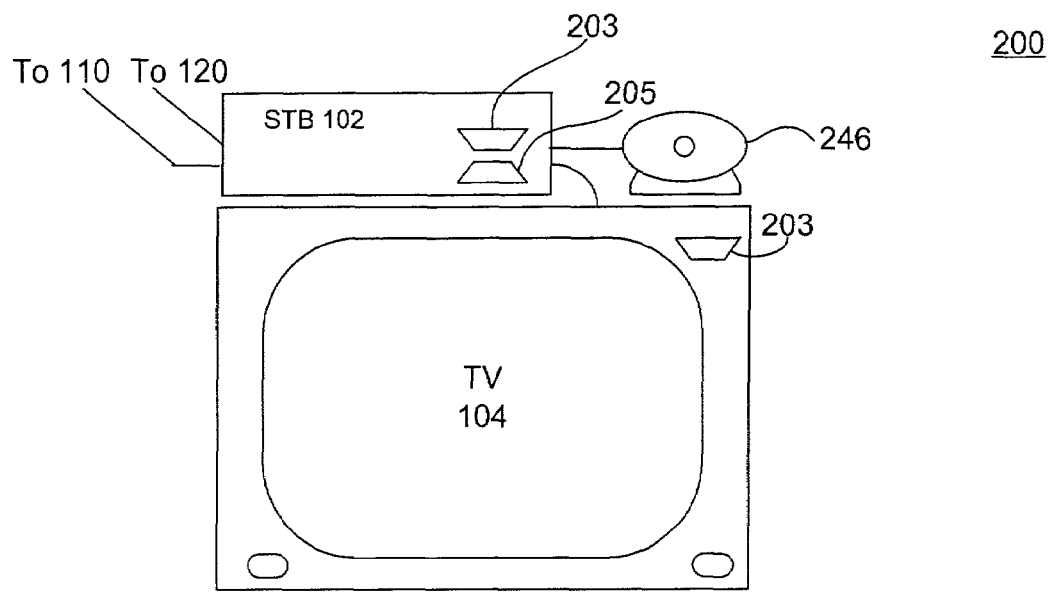
FIG. 2 is an illustration of an interactive television (ITV) system.
Figure 2:
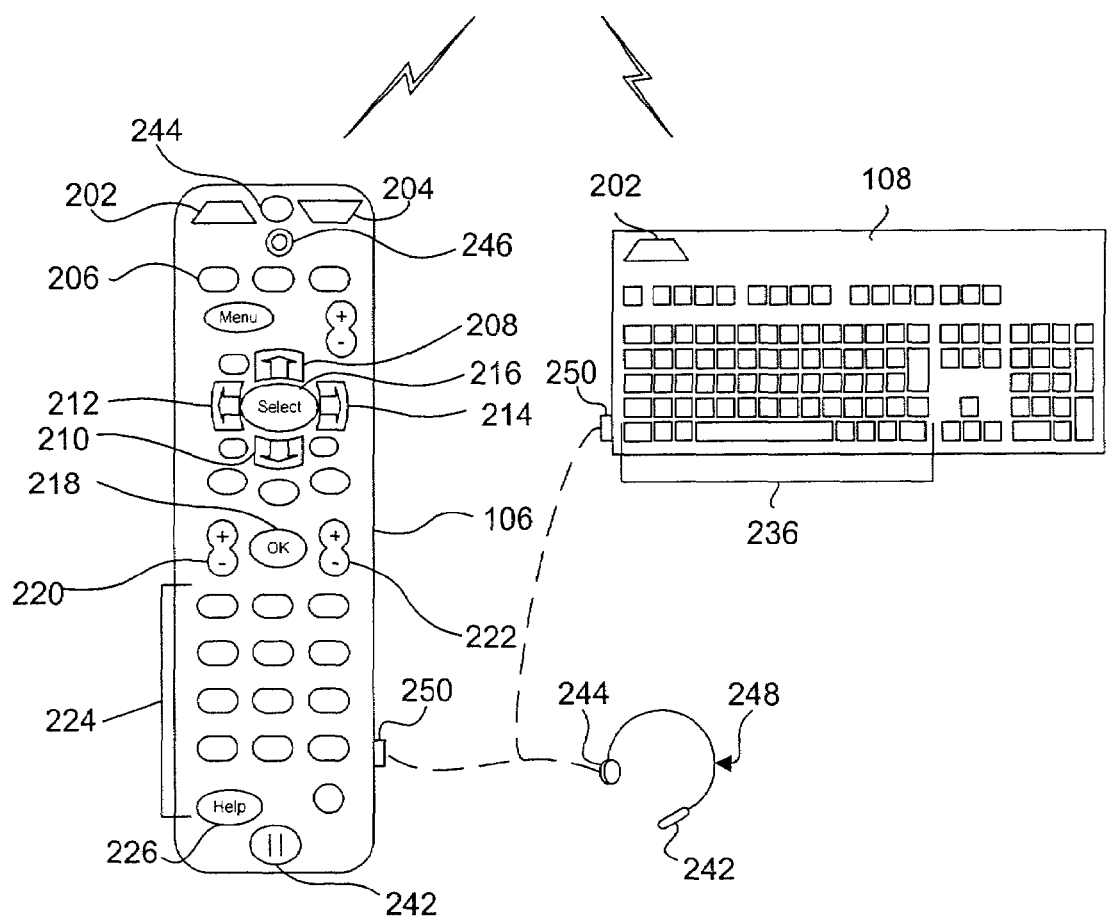

Referring now to FIG. 2, there is shown an interactive television (ITV) system 200 according to an embodiment of the invention. As depicted, the system 200 may include an STB 102, a television 104 (or other display device), a remote control 106, and, in certain configurations, a keyboard 108.

The remote control 106 is provided for convenient remote operation of the STB 102 and the television 104. In one configuration, the remote control 106 includes a wireless transmitter 202 for transmitting control signals (and possibly audio/video data) to a wireless receiver 203 within the STB 102 and/or the television 104. In certain embodiments, the remote control 106 includes a wireless receiver 204 for receiving signals from a wireless transmitter 205 within the STB 102. Operational details regarding the wireless transmitters 202, 205 and wireless receivers 203, 204 are generally well known to those of skill in the art.

The remote control 106 preferably includes a number of buttons or other similar controls. For instance, the remote control 106 may include a power button 206, an up arrow button 208, a down arrow button 210, a left arrow button 212, a right arrow button 214, a "Select" button 216, an "OK" button 218, channel adjustment buttons 220, volume adjustment buttons 222, alphanumeric buttons 224, a "Help" button 226, and the like.

Figure 3:
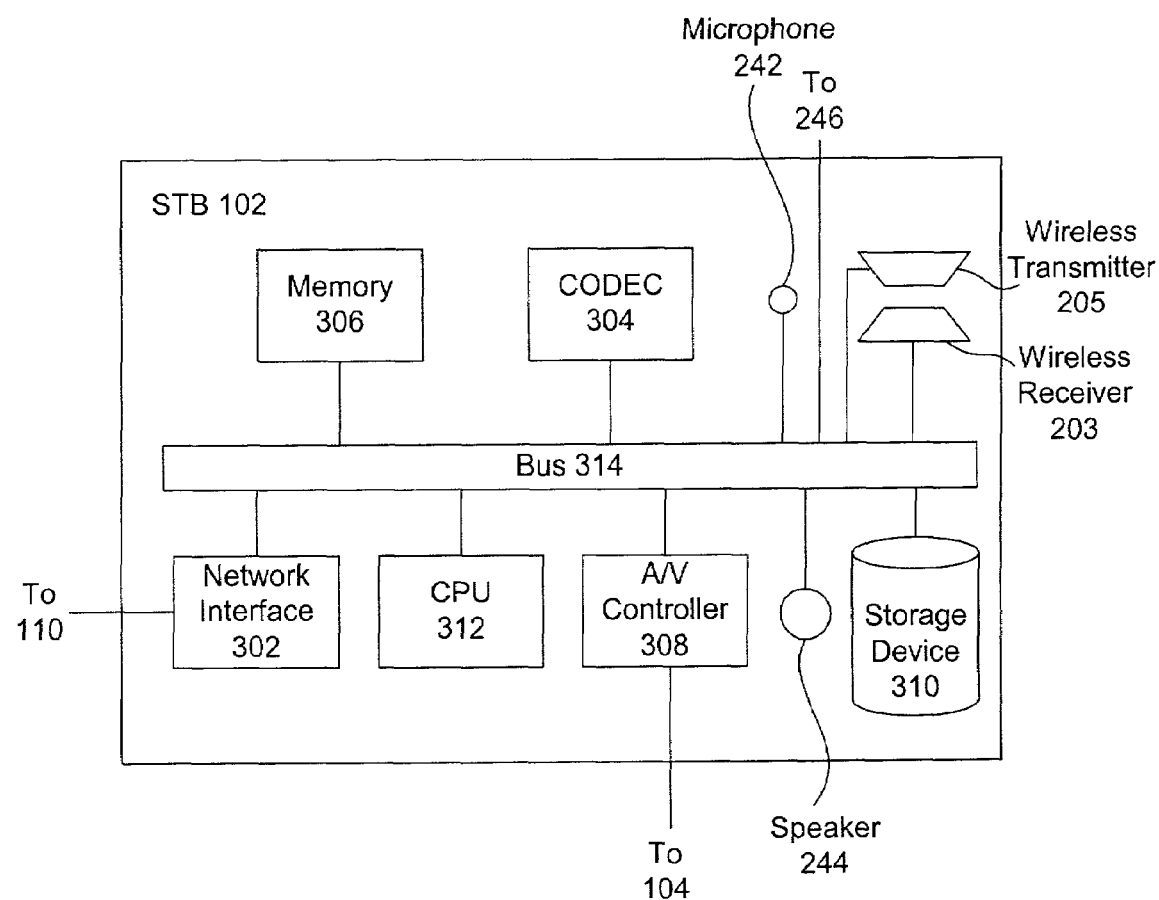
FIG. 3 is a block diagram of physical components of a set top box (STB)

In one embodiment, the remote control 106 includes a microphone 242 for capturing audio signals. The captured audio signals may be transmitted to the STB 102 via the wireless transmitter 202. In addition, the remote control 106 may include a speaker 244 for generating audible output from audio signals received from the STB 102 via the wireless receiver 204. In alternative embodiments, as shown in FIG. 3, the microphone 242 and/or speaker 244 may be integrated with the STB 102.

In certain embodiments, the remote control 106 further includes a video camera 246, such as a CCD (charge-coupled device) digital video camera, for capturing video signals. In one implementation, the video camera 246 is in electrical communication with the wireless transmitter 202 for sending the captured video signals to the STB 102. Like the microphone 242 and speaker 244, the video camera 246 may be integrated with the STB 102, or attached to the STB 102, as in the depicted embodiment.

The various components of the remote control 106 may be positioned in different locations for functionality and ergonomics. For example, as shown in FIG. 2, the speaker 244 may be positioned near the "top" of the remote control 106 (when viewed from the perspective of FIG. 2) and the microphone 242 may be positioned at the "bottom" of the remote control 106. Thus, in one embodiment, a user may conveniently position the speaker 244 near the user's ear and the microphone 242 near the user's mouth in order to operate the remote control 106 in the manner of a telephone. Of course, the remote control 106 may be embodied as a standard remote control, without audio/video capture capability.

The optional keyboard 108 facilitates rapid composition of text messages. The keyboard 108 includes a plurality of standard alphanumeric keys 236. In one configuration, the keyboard 108 includes a wireless transmitter (not shown), similar or identical to the wireless transmitter 202 of the remote control 106. The wireless transmitter transmits keystroke data from the keyboard 108 to the STB 102. Additionally, the keyboard 108 may include one or more of the buttons illustrated on the remote control 106.

Alternatively, or in addition, a hands-free headset 248 may be coupled to the remote control 106 or the keyboard 108. The headset 248 may be coupled using a standard headset jack 250. The headset 248 may include a microphone 242 and/or speaker 244. Such a headset 248 may be used to reduce audio interference from the television 104 in order to improve audio quality and to provide the convenience of hands-free operation.

Referring now to FIG. 3, there is shown a block diagram of physical components of an STB 102 according to an embodiment of the invention. As noted above, the STB 102 includes a wireless receiver 203 for receiving control signals sent by the wireless transmitter 202 in the remote control 106 and a wireless transmitter 205 for transmitting signals (such as audio/video signals) to the wireless receiver 204 in the remote control 106.

The STB 102 also includes, in one implementation, a network interface 302 for communicating with the network 101 via the broadcast center 110. The interface 302 may include conventional circuitry for receiving, demodulating, and demultiplexing MPEG packets. The interface 302 may also include conventional modem circuitry for sending or receiving data. For example, the interface 302 may conform to the DOCSIS (Data Over Cable Service Interface Specification) or DAVIC (Digital Audio-Visual Council) cable modem standards.

In one configuration, one or more frequency bands (for example, from 5 to 30 MHz) may be reserved for upstream transmission. Digital modulation (for example, quadrature amplitude modulation or vestigial sideband modulation) may be used to send digital signals in the upstream transmission. Of course, upstream transmission may be accomplished differently for different networks 101. Alternative ways to accomplish upstream transmission include using a back channel transmission, which is typically sent via an analog telephone line, ISDN, DSL, or other techniques.

The STB 102 also preferably includes a codec (encoder/decoder) 304, which serves to encode audio/video signals into a network-compatible data stream for transmission over the network 101. The codec 304 also serves to decode a network-compatible data stream received from the network 101. The codec 304 may be implemented in hardware and/or software. Moreover, the codec 304 may use various standard algorithms, such as MPEG and/or Voice over IP (VoIP), for encoding and decoding.

The STB 102 further includes a memory device 306, such as a random access memory (RAM), for storing temporary data. Similarly, a read-only memory (ROM) may be provided for storing more permanent data, such as fixed code and configuration information.

In one embodiment, an audio/video (A/V) controller 308 is provided for converting digital audio/video signals into analog signals for playback/display on the television 104. The A/V controller 308 may be implemented using one or more physical devices, such as separate graphics and sound controllers. The A/V controller 308 may include graphics hardware for performing bit-block transfers (bit-blits) and other graphical operations for displaying a graphical user interface (GUI) on the television 104.

In some implementations, the STB 102 may include a storage device 310, such as a hard disk drive or the like. The storage device 310 may be configured to store encoded incoming and outgoing video signals as well as television broadcasts and retrieve the same at a later time for display. The storage device 310 may be configured, in one embodiment, as a personal video recorder (PVR), enabling scheduled recording of television programs, pausing (buffering) live video, etc. The storage device 310 may also be used in various embodiments to store viewer preferences, parental lock settings, electronic program guide (EPG) data, passwords, e-mail messages, video messages, video greetings, and the like. In one implementation, the storage device 310 also stores an operating system (OS) for the STB 102, such as Windows CE® or Linux®.

As noted above, the STB 102 may include, in certain embodiments, a microphone 242 and a speaker 244 for capturing and reproducing audio signals, respectively. The STB 102 may also include or be coupled to a video camera 246 for capturing video signals. These components may be included in lieu of or in addition to similar components in the remote control 106, keyboard 108, and/or television 104.

A CPU 312 controls the operation of the STB 102, including the other components thereof, which are coupled to the CPU 312 in one embodiment via a bus 314. The CPU 312 may be embodied as a microprocessor, a microcontroller, a digital signal processor (DSP) or other device known in the art. For instance, the CPU 312 may be embodied as an Intel® x86 processor. As noted above, the CPU 312 may perform logical and arithmetic operations based on program code stored within the memory 306 or the storage device 310.

Of course, FIG. 3 illustrates only one possible configuration of an STB 102. Those skilled in the art will recognize that various other architectures and components may be provided within the scope of the invention. In addition, various standard components are not illustrated in order to avoid obscuring aspects of the invention.

Figure 4:
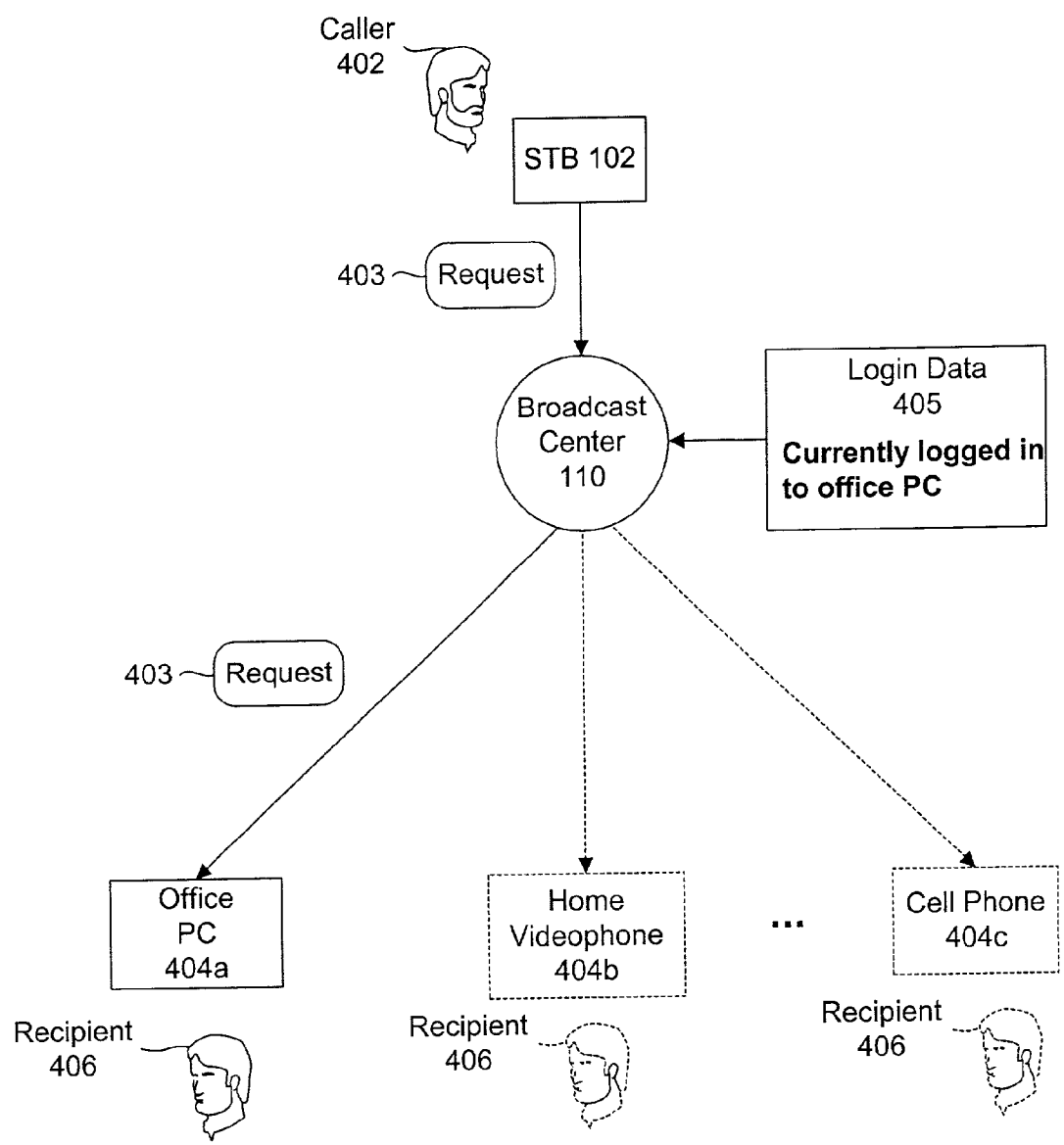
FIG. 4 is a dataflow diagram according to a first embodiment of the invention.

Referring now to FIG. 4, a caller 402 initiates a video call, in one embodiment, by sending a video communication request 403 to a broadcast center 110 or other network node. As previously explained, the request 403 may be embodied in various forms, depending on the hardware and/or software being used.

Upon receiving the request 403, the broadcast center 110 identifies the recipient 406 from information contained within the request 403. In one configuration, the broadcast center 110 extracts an identifier from the request 403 that uniquely identifies the recipient 406. The identifier may include, for instance, the recipient's name, social security number, e-mail address, and/or personal network address (e.g., ENUM address). In one configuration, the identifier may include the name of the recipient 406 appended by a ".vp" extension, e.g. "Paul_Allen.vp".

Once the recipient 406 is identified, the broadcast center 110 determines a set of communication devices 404 that may be accessible to the recipient 406. Certain communication devices 404 may only support audio communication, while others may support both audio and video communication. For example, a recipient 406 may have access to a personal computer (PC) 404a at work, a dedicated videophone 404b at home, and cell phone 404c on his or her person. Of course, other communication devices 404 may be associated with a recipient 406 including a home STB 102 (not shown), a home PC (not shown), and the like.

Once the set of communication devices 404 is determined, the broadcast center 110 selects the communication device 404 having the highest probability of being presently accessible to the recipient 406. This determination may be made using various techniques, embodiments of which are described below. Such techniques are referred to herein as "presence determination." Of course, those of skill in the art will recognize that numerous other techniques and/or methods may be used within the spirit and scope of the invention.

While the following techniques are described individually, two or more techniques may be employed, serially or in parallel. For example, multiple techniques may be used in combination, with the results being heuristically combined to select the highest-probability device. Alternatively, where a primary technique may fail to achieve two-way communication between the caller 402 and the recipient 406 (e.g., the recipient 406 does not answer), a secondary technique may be employed.

In one exemplary embodiment, as shown in FIG. 4, login data 405 is used to determine which device 404 has the highest probability of being presently accessible to the user. Many communication devices, such as personal computers, ITV systems, and the like, require or permit a user to "log in" or authenticate by means of a user name and password. The login process may be provided for security purposes or merely to facilitate personalization of the device 404.

In one embodiment, when a user successfully logs in, the device 404 notifies the broadcast center 110. The broadcast center 110 then maintains a database of login data 405 that may be consulted when a request 403 is received.

If the user is logged into a single device, such as the office PC 404a of FIG. 4, that device may be selected to receive the request 403, since a high likelihood exists that the device 404a is still accessible to the user. This is particularly true if the login data 405 includes an indication of the time at which the user logged in, and that the indicated time is relatively recent.

If a user is logged into multiple devices, suggesting, for example, that the user failed to log out of a first device 404 before logging into a second one, the login time may also be used to select the device 404. For example, the device 404 with the most recent login time may be selected as having the highest probably of being presently accessible to the recipient 406.

In one embodiment, the broadcast center 110 then forwards the video communication request 403 to the selected device 404 (e.g., the office PC 404a of FIG. 4). This may include addressing the request 403 to a unique network address of the selected device 404.

If the request 403 is accepted, video communication is established between the devices of the caller 402 and the recipient 406 using standard techniques. If the request 403 is not accepted within an established time interval, the broadcast center 110 selects the communication device 404 that is next most likely to be presently accessible to the recipient 406, and so on.

For example, as shown in FIG. 4, the cell phone 404c may be determined to be the next most accessible device 404 following the office PC 404a. Therefore, the broadcast center 110 forwards the video communication request 403 to the cell phone 404c.

In certain configurations, the broadcast center 110 may detect that the selected device 404, e.g. the cell phone 404c, supports only audio communication. Accordingly, if the recipient 406 accepts, an audio-only connection between the caller 402 and the recipient 406 is established. If the recipient 406 does not accept within an established time interval, the broadcast center 110 selects another device 404 from the set, and so on, until the recipient 406 accepts, or all the devices 404 have been selected.

Thus, in one embodiment, the caller 402 may use a single address to establish video communication with a recipient 406 associated with multiple devices 404, each with a different network address. The caller 402 need not guess which device 404 is most accessible to the recipient 406. In addition, the request 403 is automatically forwarded to other devices 404 when the recipient 406 does not answer.

Figure 5:
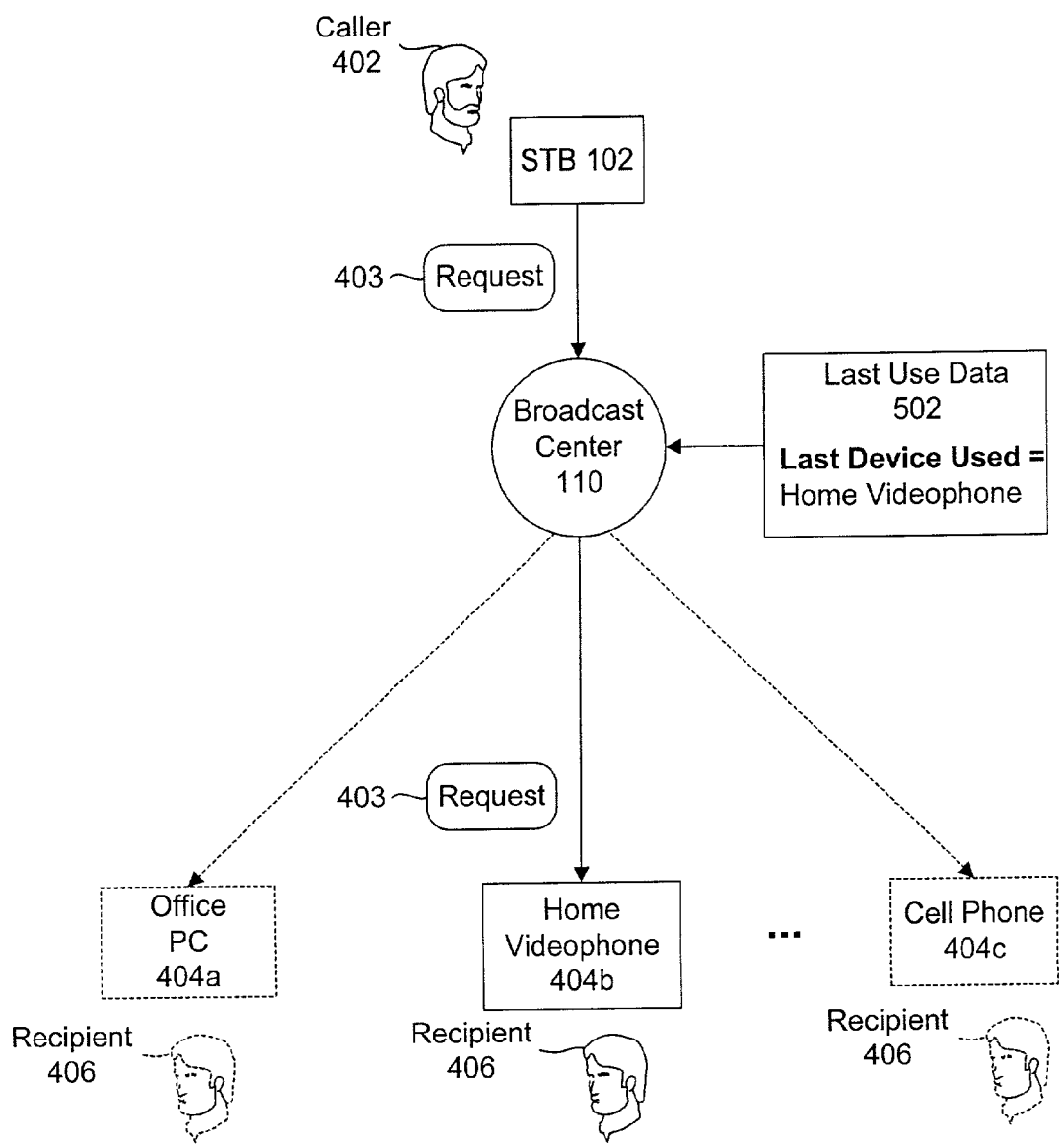
FIG. 5 is a dataflow diagram according to a second embodiment of the invention.

In an alternative embodiment, as shown in FIG. 5, selection of the most accessible device 404 is made with reference to the last device 404 used by the recipient, e.g., "last use" data 502. For instance, the last use data 502 may indicate that a home videophone 404b was the last device 404 used by the recipient 406. Accordingly, the home videophone 404b may be selected by the broadcast center 110 in one embodiment.

Of course, if the time that the device 404 was last used is too far in the past, e.g., twenty-four hours, the last use data 502 may be ignored and the broadcast center 110 may employ another technique with a higher probability of successfully determining which device 404 is most accessible.

Figure 6:
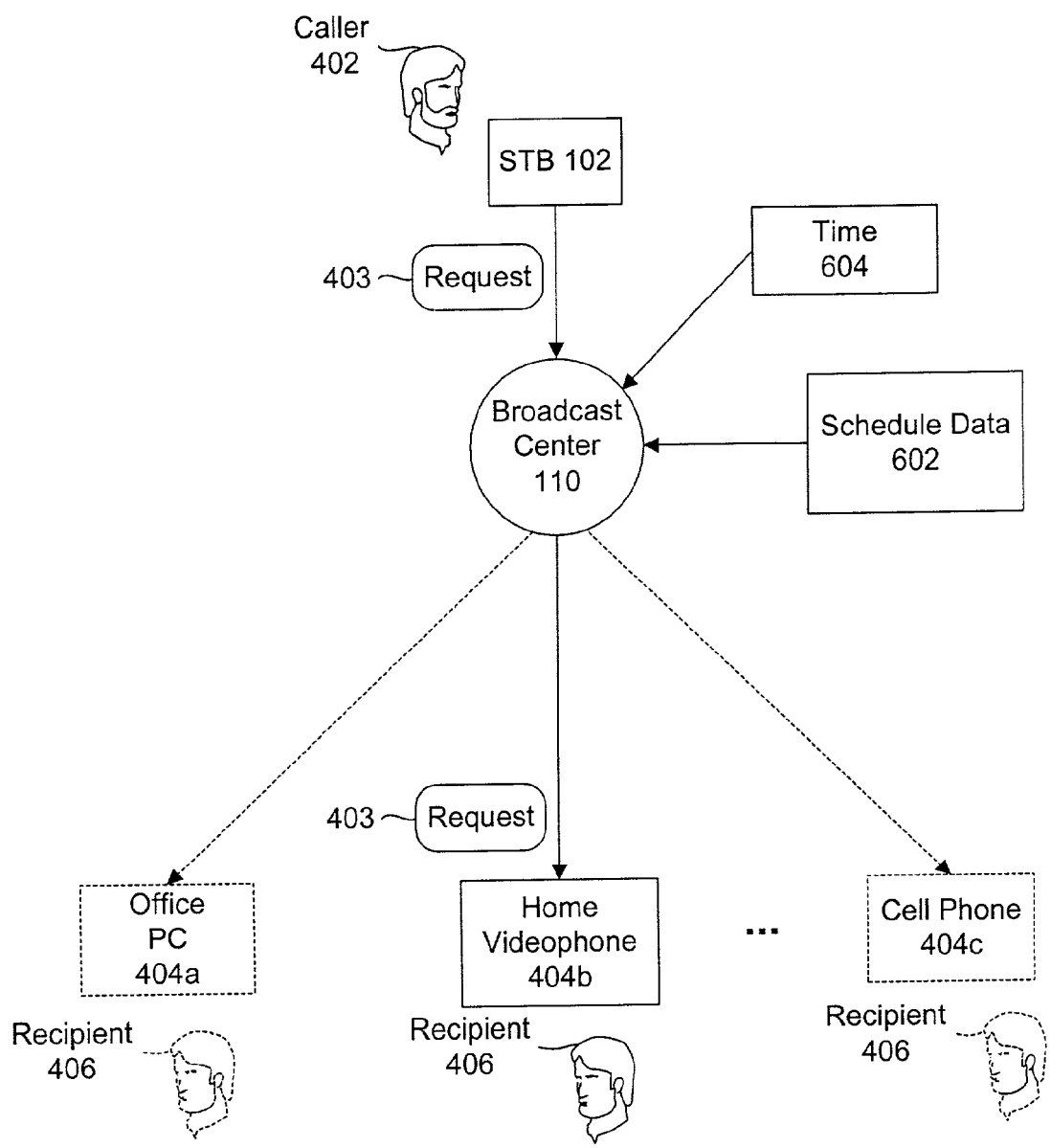
FIG. 6 is a dataflow diagram according to a third embodiment of the invention.

In another alternative embodiment, a shown in FIG. 6, schedule data 602, provided by the recipient 406, may be used to select which device 404 has the highest probability of being accessible to the recipient 406. The schedule data 602 may indicate which devices 404 the recipient 406 expects to be using at various times and/or the probable physical location of the recipient 406.

The schedule data 602 may be provided specifically for purposes of presence determination, or may be derived from more general schedule information, such as the a recipient's personal information manager (PIM), e.g., Microsoft Outlook®. The schedule data 602 may be stored within the broadcast center 110, or may be obtained by the broadcast center 110 on demand from another computer system or device.

As shown in FIG. 7, the schedule data 602 may be represented as a table 702 including a number of rows and columns. Of course, a variety of other data structures may be provided within the scope of the invention.

In one embodiment, the table 702 may include columns corresponding to a time interval 704, as well as a physical location 706 and/or a device name 708 or network address 710. Each record 712 indicates the recipient's probable physical location 706 and a device 404 expected to be most accessible during the time interval 704. For example, between 9 am and 5 pm the recipient 406 expects to be at the office. Therefore, a record 712 is added with the 9 am to 5 pm time interval 704, office location 706, office PC name 708, and office PC network address 710. Of course, in other embodiments, the table 702 may only indicate the physical location 706, in which case another table or data structure (not shown) may be used to correlate physical locations 706 with device names 708 and/or network addresses 710. In the depicted embodiment of FIG. 6, the device 404 is selected using the schedule data 602 and the time 604 the request 403 was received.

With the set of communication devices 404 determined, the broadcast center 110 searches the schedule data 602 according to the reception time 604 to select the device 404. For example, suppose a request 403 is received at the broadcast center 110 at 7:32 pm. Accordingly, the probable physical location 706 of the recipient 406 is at home. The broadcast center 110 identifies the home videophone 404b as the device 404 in closest proximity to the probable physical location 706 of the recipient 406 and selects the home videophone 404b. Of course the actual physical location of the recipient 406 may not be at home. In such a case, as discussed above, the request 403 may be forwarded to another device 404 within the set.

Figure 8:
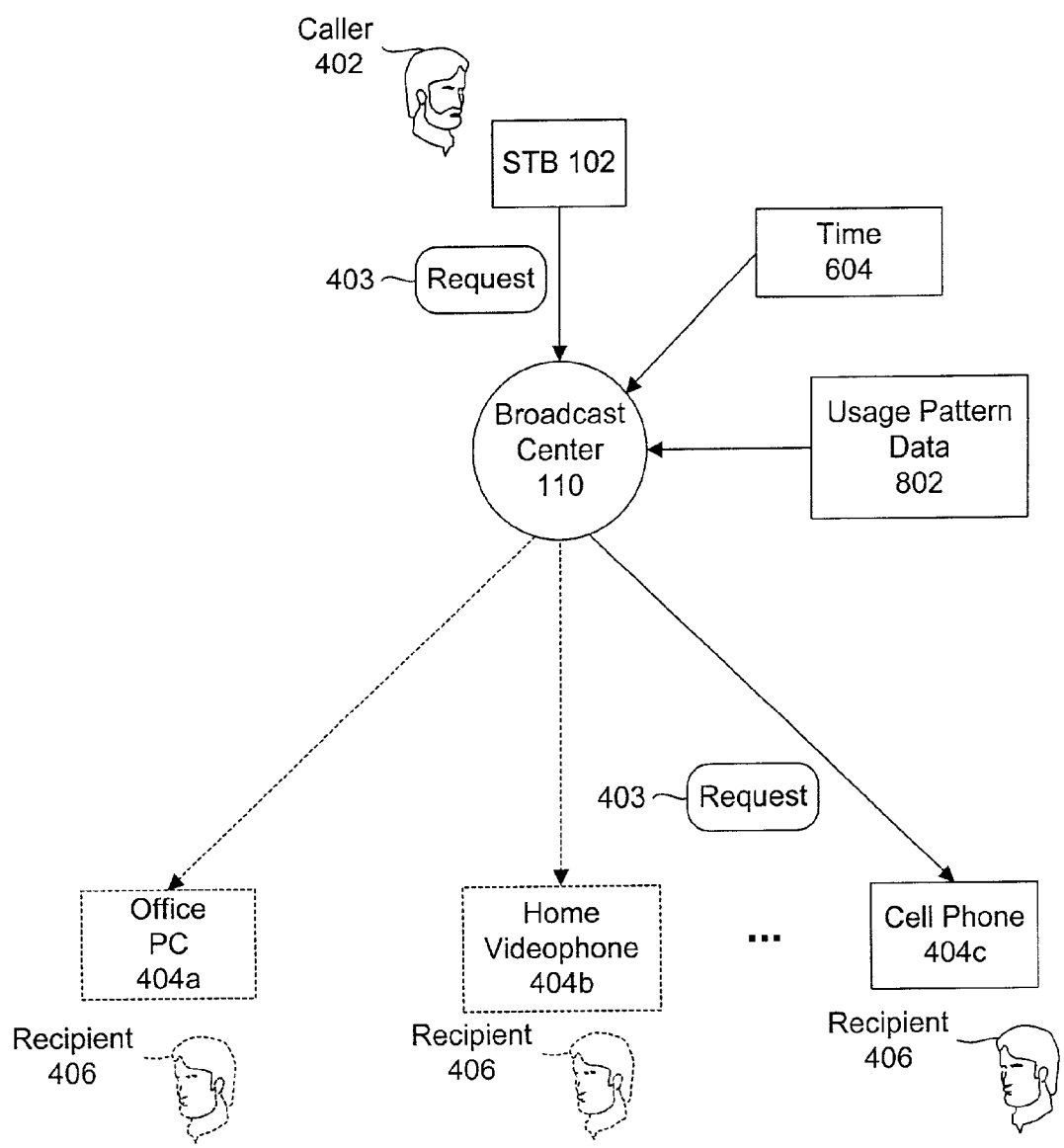
FIG. 8 is a dataflow diagram according to a fourth embodiment of the invention.

In an alternative embodiment, as shown in FIG. 8, usage pattern data 802 and an reception time 604 are used to select the device 404 most likely to be accessible to the recipient 406. Usage pattern data 802 may include a set of machine generated rules concerning video communication habits of the recipient 406. In certain embodiments, the rules may be viewed and modified by a user. Usage pattern data 802 may be generated by a broadcast center 110 configured to monitor communications of the recipient 406 using the devices 404. Of course one or more different devices may monitor communications, generate usage pattern data 802, and receive communication requests 403.

Usage pattern data 802, illustrated in a tabular format in FIG. 9, may be generated to reflect historical video communication patterns of a recipient 406. In one embodiment, certain historical information from each communication may be recorded including the time, date, day of week, call duration, communication device 404 used, and the like. Periodically, the broadcast center 110 may then search the historical information for patterns. The search of the historical information may use well known data mining and artificial intelligence (AI) methods.

Table 902 illustrates a few example records 904 of rules derived from historical information. Each record 904 may include a rule number 906, rule description 908, and a date 910 on which the rule was generated. In addition, the table 902 may include other columns 912 for storing communication information, such as the device 404 to be selected, and the like. Of course, the data in the table 902 may be in human-readable or non-human-readable form, and may be configured in various different ways within the scope of the invention.

Referring back to FIG. 8, video communication requests 403 are routed to a recipient 406 based on usage pattern data 802. In one embodiment, the broadcast center 110 accesses the usage pattern data 802 to determine which device 404 to select for forwarding of the request 403. As with schedule data 602 discussed in relation to FIG. 6, the usage pattern data 802 may be stored on an Internet server, database, storage device 310, or the like. Similarly, the reception time 604 may includes the time, date, day of the week, and the like. The usage pattern data 802 is searched for a rule which most closely represents the time 604 of the received request 403. Once a rule is found, the request 403 is forwarded to the device 404 indicated by the rule.

For example, a caller 402 may send a video communication request 403 at 6:00 am on Wednesday. The request 403 is received and the usage pattern data 802 is searched. Rule #3 indicates the recipient generally places a video call from the cell phone 404c on Wednesdays at 6:00 am. Therefore, the request 403 is forwarded to the cell phone 404c.

Figure 10:
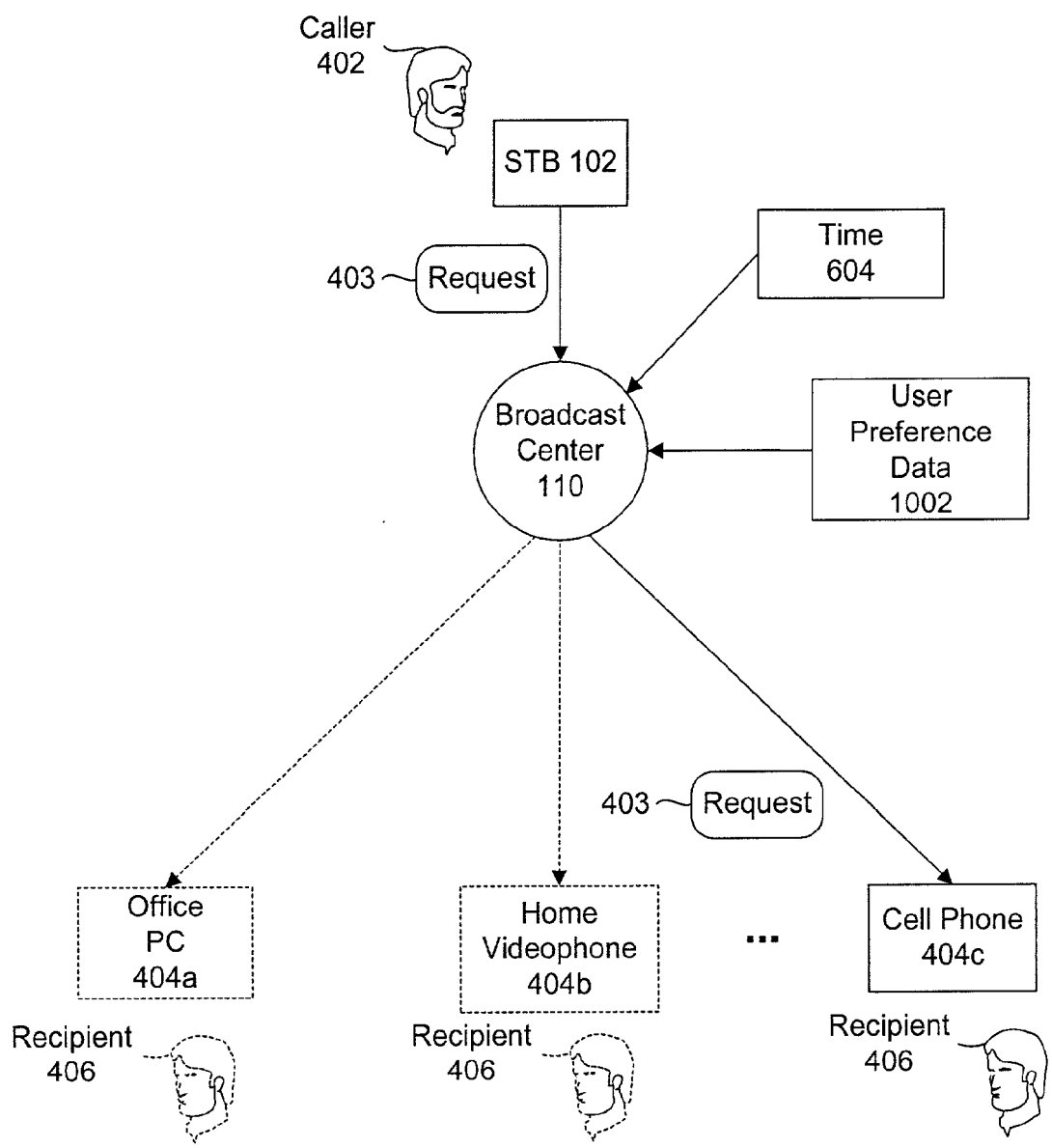
FIG. 10 is a dataflow diagram according to a fifth embodiment of the invention.

In an alternative embodiment, as shown in FIG. 10, the reception time 604 and user preference data 1002 are used to select a device 404. User preference data 1002 is information defined primarily by a user (e.g., the recipient 406). In one embodiment, the user preference data 1002 indicates a priority for selecting communication devices 404a-c during general time intervals. Alternatively, user preference data 1002 may simply designate a priority or order for selecting the devices 404a-c regardless of the time 604, e.g. when a first device 404 does not respond, a second device 404 may be selected, etc.

A table 1102, shown in FIG. 11, illustrates an example of user preference data 1002 according to one embodiment. The table 1102 includes time intervals 704, device names 708, and network addresses 710, similar to those described in relation to FIG. 7. The table 1102 also includes a day 1104 column. The day 1104 may indicate a type of day such as weekday, weekend, holiday, a date range, or the like. Of course, the table 1102 may be configured in various different ways without departing from the spirit and scope of the invention.

Suppose a communication request 403 is made at 7:00 pm on Sep. 15, 2001. Using the reception time 604, including the day and time, the broadcast center 110 identifies, from the user preference data 1002, the cell phone 404c as the device to be selected. The request 403 is then forwarded to the cell phone 404c.

Figure 12:
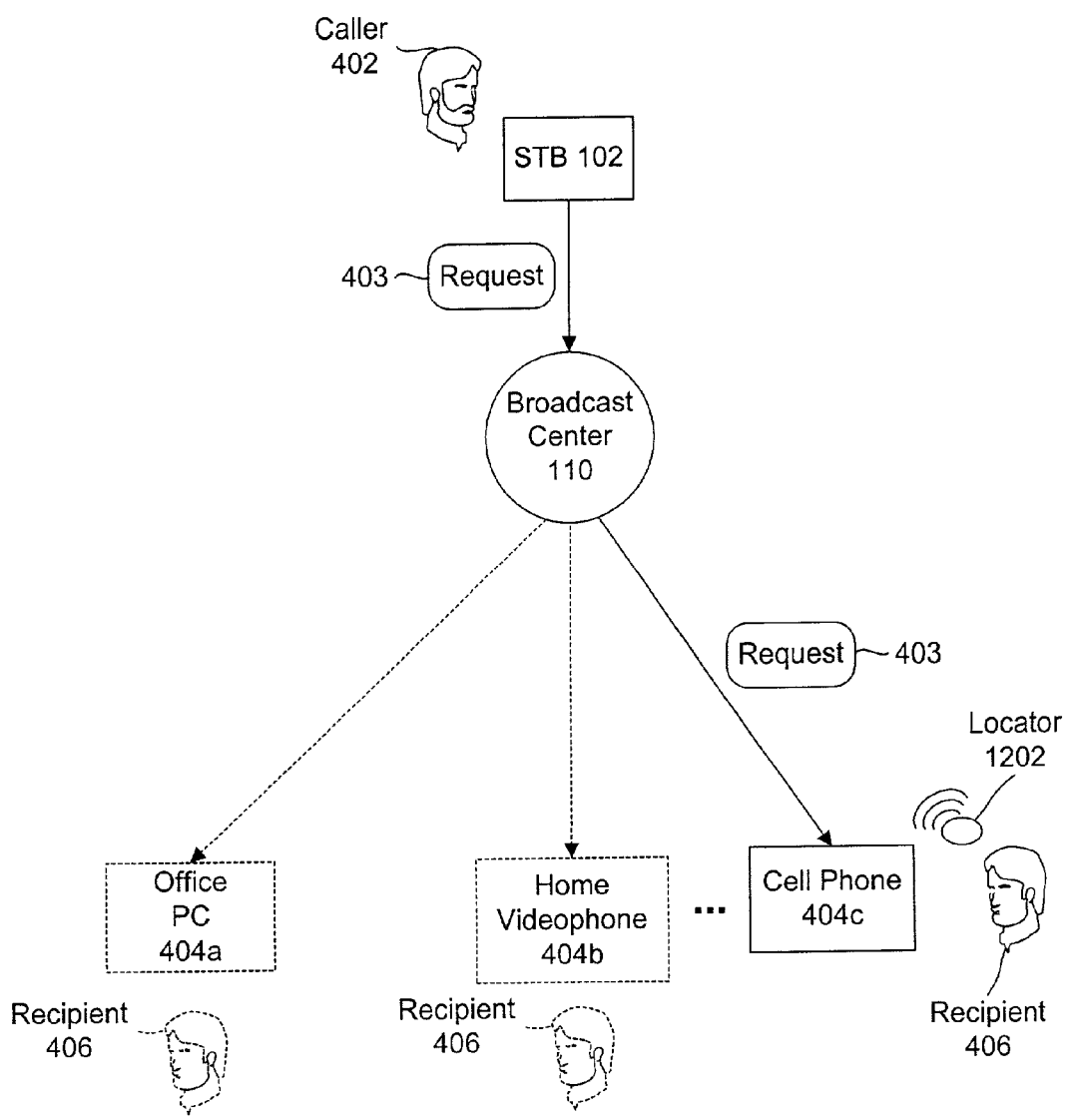
FIG. 12 is a dataflow diagram according to a sixth embodiment of the invention.

Referring now to FIG. 12, an alternative embodiment utilizes a locator device 1202 to select a device 404 associated with a recipient 406 based on the recipient's actual presence. The locator device 1202 may be embodied as any one of a number of devices for monitoring a person's geographic location using, for example, Global Positioning Satellite (GPS) technology, infrared (IR) or radio frequency (RF) technologies, and the like.

In one embodiment, the broadcast center 110 receives requests 403 and monitors the location of the locator device 1202 using well known methods according to the technology of the locator device 1202. Preferably, the locator device 1202 is directly associated with the recipient's person. For example, the locator device 1202 may be integrated with a watch, ring, or other personal item in close proximity to the recipient 406. Alternatively, the locator device 1202 may be integrated with a communication device 404. For example, a cell phone 404c may be tracked by the broadcast center 110 moving from cell to cell in a telephone network.

In one embodiment, configuration information identifying each device 404a-c associated with a recipient 406 is stored within the broadcast center 110. The configuration information may include a physical location for the device 404. Thus, when a request 403 is received, a broadcast center 110 may select the device 404 in closest proximity to the recipient's actual physical location, as indicated by the locator device 1202.

In an alternative embodiment, a communication device 404 may automatically send an indication of the recipient's presence to the broadcast center 110. For example, the office PC 404a may detect a keystroke while the recipient 406 is logged in and send an indication of the recipient's presence to the broadcast center 110. In one configuration, if the indication of the recipient's presence is received within an established time interval, for example, 5 minutes, requests 403 received during the time interval are forwarded to the office PC 404a. The indication may be sent according to a format and protocol compatible with the device 404 and the broadcast center 110.

In one aspect, the indication of the recipient's presence is sent in response to a user command. For example, the recipient 406 may press a specifically designated button on a communication device 404 to cause the indication to be sent to the broadcast center 110. Accordingly, all requests 403 received after receipt of the indication may be forwarded to the communication device 404 which sent the indication.

Figure 13:
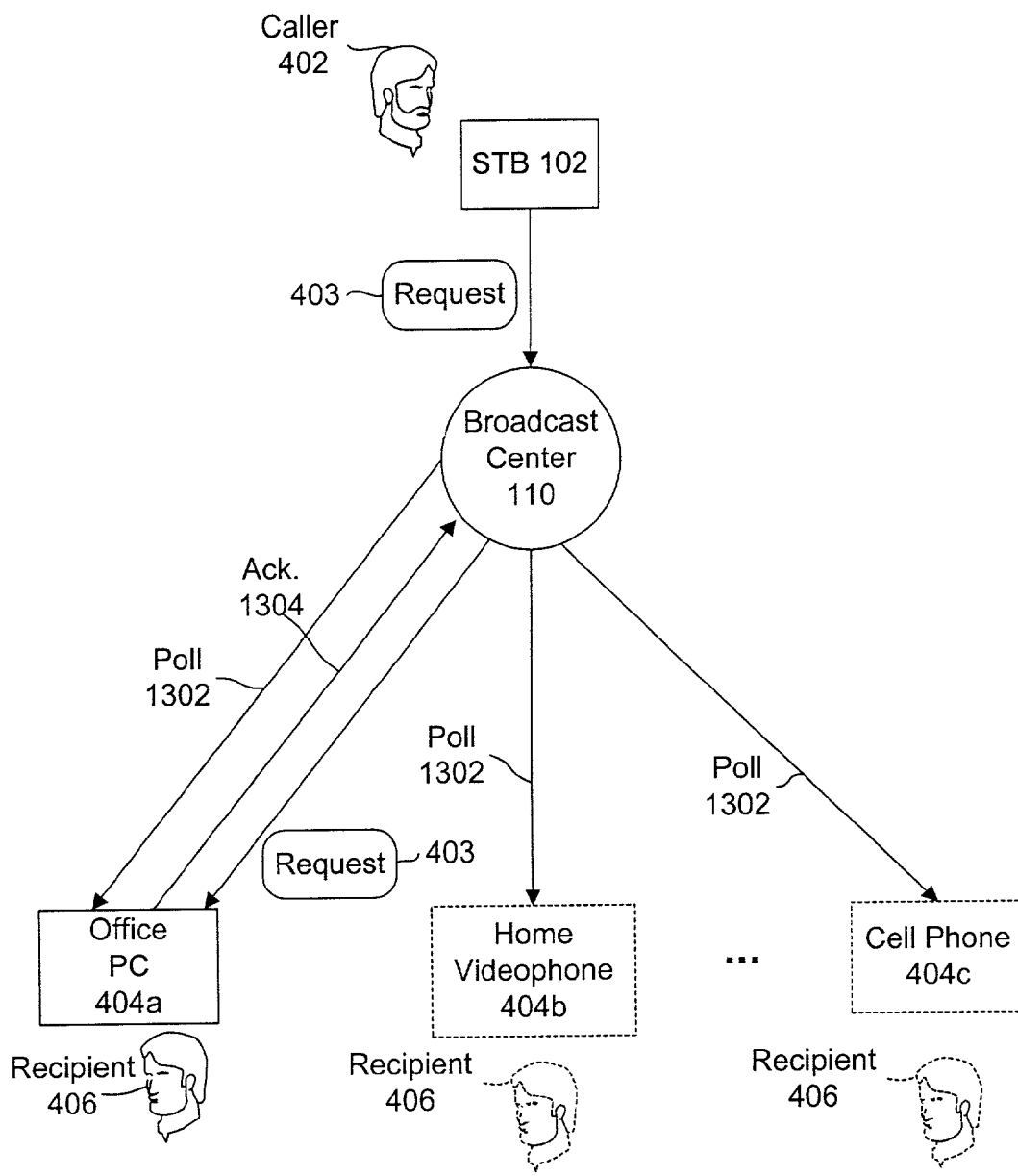
FIG. 13 is a dataflow diagram according to a seventh embodiment of the invention.

Referring now to FIG. 13, an alternative embodiment for selecting the device 404 involves sending a polling signal 1302 to each device 404 within the set of devices 404 to determine the recipient's presence. Each device 404 then determines whether the recipient 406 is using the device 404 (is present) using techniques described above. If a device 404 determines the recipient 406 is present, an indication, such as an acknowledgement signal 1304, is sent to the broadcast center 110. In one embodiment, the broadcast center 110 selects the device 404 which sent the acknowledgement signal 1304.

Determining whether the recipient 406 is present may be accomplished using methods discussed above including measuring time between keystrokes, identifying whether the recipient 406 is logged in, identifying whether the device 404 is currently in use for communication, receiving an input command indicating a recipient's presence, as well as various other methods. As an example, the broadcast center 110 sends a polling signal 1302 to each device 404a-c. In response to the polling signal 1302, the office PC 404a detects a very short time interval between keystrokes. Therefore, the office PC 404a responds with an acknowledgement signal 1304 while the other devices 404b-c send no response. Accordingly, the request 403 is forwarded to the office PC 404a.

Of course, two devices 404 may have the same probability of being accessible to the recipient 406 at the time a request 403 is received. For example, selecting a device 404 using usage pattern data 802 may result in the reception time 604 matching two rules indicating two different devices 404. In this situation, certain embodiments may determine that a first device 404, e.g. office PC 404a, supports audio and video communication and a second device 404, e.g. cell phone 404c, supports only audio communication. In response to making this determination, the broadcast center 110 may select the device 404 having more robust communication functionality, e.g. office PC 404a.

Figure 14:
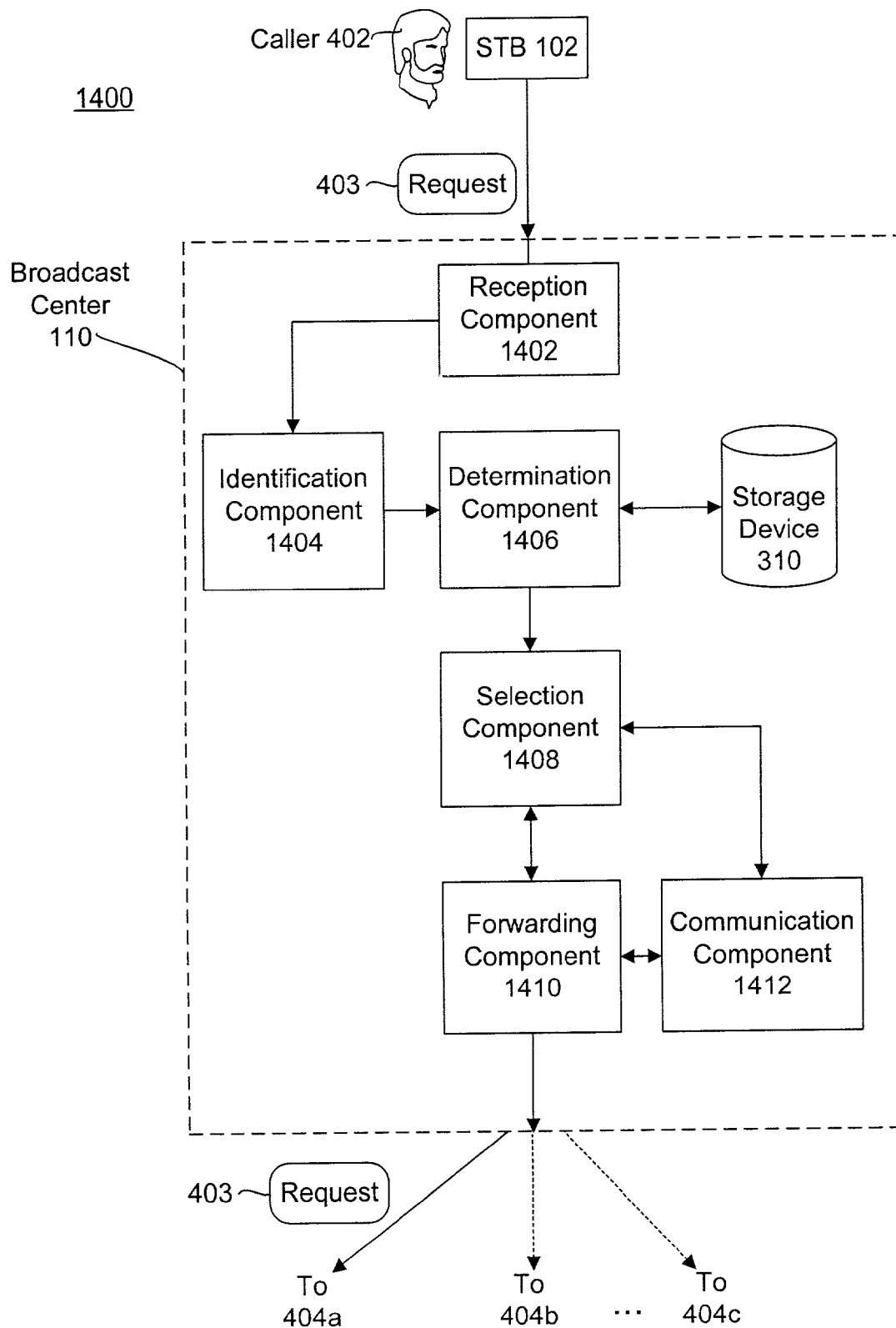
FIG. 14 is a block diagram of logical components of a system for routing video calls to a particular communication device of a recipient based on presence determination.

Referring now to FIG. 14, a system 1400 for routing video calls to a recipient 406 is illustrated. The depicted logical components may be implemented using one or more of the physical components shown in FIG. 3. Of course other well known physical components typically used in a broadcast center 110 may be used to implement the depicted logical components. Additionally, or in the alternative, various logical components may be implemented as software modules stored in the memory 306 and/or storage device 310 and executed by the CPU 312. Those skilled in the art will recognize that various illustrated components may be combined together or integrated with standard components in various configurations without departing from the scope or spirit of the invention.

As noted above, a caller's STB 102 may send a video communication request 403 which is received at the broadcast center 110. In one embodiment, the system 1400 includes a reception component 1402, which receives the request 403 addressed to the recipient 406, as described above in connection with FIG. 4. The reception component 1402 may be implemented as a software module executing on a CPU 312 in communication with a network interface 302 of the broadcast center 110. The network interface 302 monitors incoming packets received from the network 101. Of course, a variety of other implementations are possible.

The system 1400 may also include an identification component 1404 in communication with the reception component 1402. In one implementation, once the reception component 1402 detects a request 403, the identification component 1404 extracts an address (e.g., an ENUM address) from the request 403 to uniquely identify the recipient 406, as described in connection with FIG. 4. The address may comprise a simple mnemonic to allow for easy memorizing of the address.

In the depicted embodiment, the identification component 1404 interacts with a determination component 1406. As described in connection with FIG. 4, the determination component 1406 determines a set of communication devices 404 associated with the recipient 406. This set may comprise configuration information stored on a storage device 310 accessible to the broadcast center 110. Alternatively, the configuration information for devices 404 within the set may be stored in memory 306 at the broadcast center 110.

Thereafter, a selection component 1408 selects a first device 404 from the set having a highest probability of being accessible to the recipient 406. As described above in FIGS. 4-13, various selection methods and techniques may be used to select the device 404. In some embodiments, a storage device 310 may be accessed to retrieve information such as last use data 502, schedule data 602, usage pattern data 802, user preference data 1002, or the like.

Once a first device 404 is selected, the selection component 1408 signals a forwarding component 1410 to forward the request 403 to the selected device 404a. In one embodiment, the forwarding component 1410 uses configuration information for the selected device 404a to replace the recipient address with a network address for the device 404a. Thus, network addresses need not be used by the caller 402.

If the recipient 406 accepts the request 403 at the selected device 404a, a communication component 1412 establishes communication between the caller 402 and the recipient 406. In certain configurations, the communication component 1412 detects that the selected device 404 and the caller's device do not each support the same type of communication. For example, the caller's device (e.g., STB 102) may support audio and video while the selected device 404 only supports audio. In this case, the communication component 1412 establishes the highest level of communication supported by both devices 102, 404, e.g., audio.

If the recipient 406 does not accept the request 403 within an established time interval, the communication component 1412 signals the selection component 1408 to select a second communication device 404 that is next most likely to be presently accessible to the recipient 406. If the recipient 406 does not accept the request 403 using the second communication device 404, the forwarding component 1410 and selection component 1408 cooperate to send the request 403 to another device 404 within the set, and so on.

Figure 15:
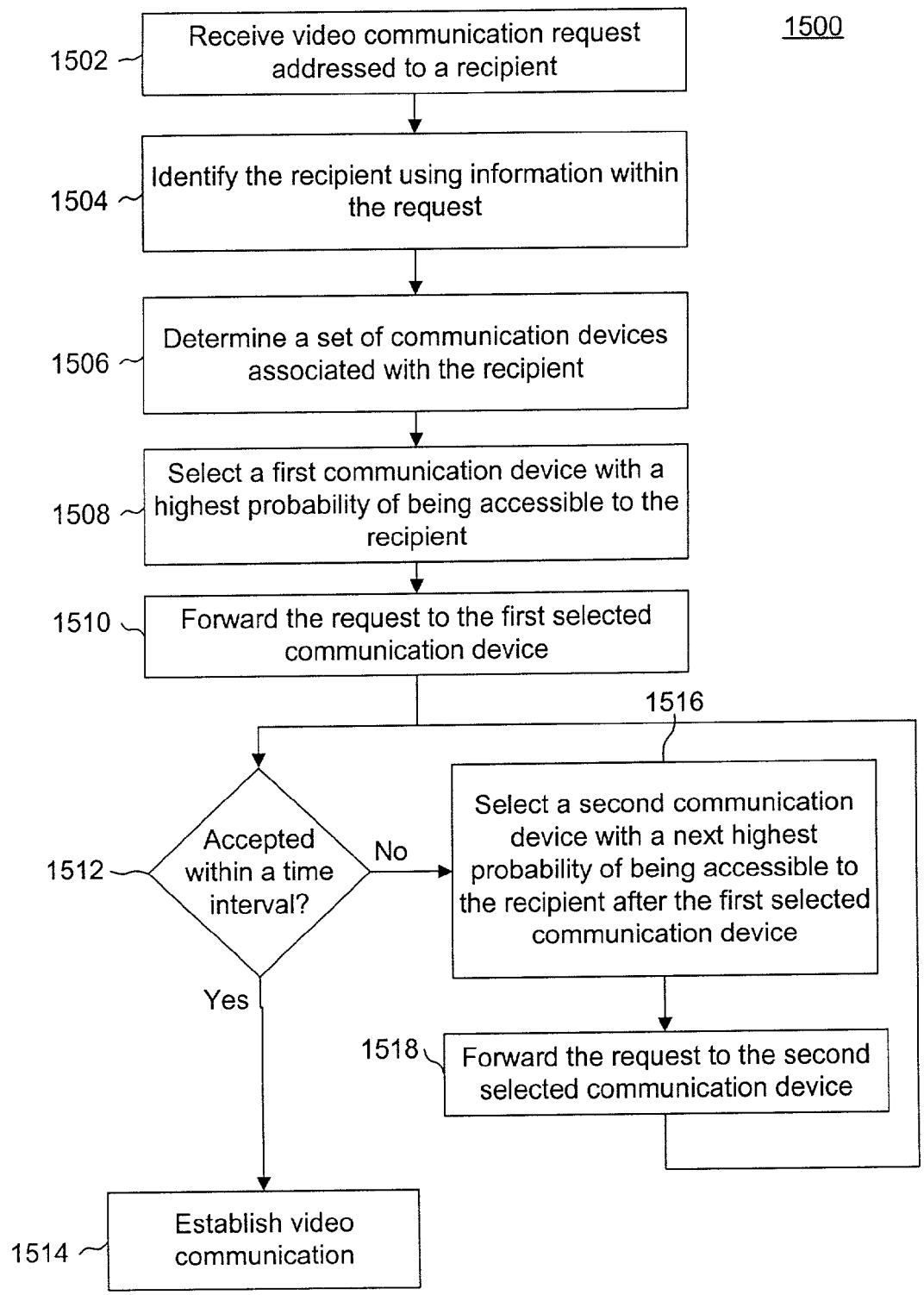
FIG. 15 is a flowchart of a method for routing video calls to a particular communication device of a recipient based on presence determination.

Referring now to FIG. 15, there is shown a flowchart of a method 1500 for routing video calls to a recipient 406. The method 1500 begins by receiving 1502 a request 403 addressed to a recipient 406. Next, the recipient 406 is identified 1504 using information within the request 403. Thereafter, a set of communication devices 404 associated with the recipient 406 is determined 1506.

A first communication device 404 with a highest probability of being accessible to the recipient 406 is then selected 1508 from the set. The first device 404 may be selected according a variety of methods and techniques, as discussed above. Thereafter, the request 403 is forwarded 1510 to the first selected communication device 404.

A determination 1512 is then made whether the recipient 406 accepts the request 403 within an established time interval. If so, video communication is established 1514 between the caller 402 and the recipient 406. If not, a second communication device 404 with a next highest probability of being most accessible to a recipient 406 is then selected 1516. As above, the request 403 is then forwarded 1518 to the second communication device 404. Thereafter, the method 1500 continues with the determination 1512 step until the recipient accepts the request 403 at the selected device 404 or all the devices 404 within the set have been selected.

Of course the recipient 406 may reject the request 403 at the selected device 404. For example, by pressing a designated button on the device 404, the request 403 may be rejected. Since a rejected request 403 indicates the recipient's presence at the selected device 404, rejection of the request 403, like establishing 1514 of video communication, terminates the method 1500.

Based on the foregoing, the present invention offers a number of advantages not available in conventional approaches. A caller may use a single address to communicate with a recipient associated with multiple communication devices without attempting to contact each device in turn. If the recipient changes physical locations, for example, due to a move, the caller may still use the same address. Video calls are routed to a recipient based on a logical determination of a communication device most accessible to the recipient according to usage pattern data, user preference data, a recipient's schedule, a locator device, and the like. In addition, video calls may be routed to a communication device in closest proximity a recipient's actual physical location.

While specific embodiments and applications of the present invention have been illustrated and described, it is to be understood that the invention is not limited to the precise configuration and components disclosed herein. Various modifications, changes, and variations apparent to those skilled in the art may be made in the arrangement, operation, and details of the methods and systems of the present invention disclosed herein without departing from the spirit and scope of the invention.

What is claimed is:

1. A method for routing video calls to a user of multiple communication devices, the method comprising:
   receiving a request to establish two-way video communication between a caller and a recipient, the request being addressed to the recipient;
   identifying the recipient from information contained within the request;
   determining a set of communication devices capable of two-way video communication associated with the recipient;
   selecting from the set of communication devices a first communication device with a highest probability of being presently accessible to the recipient at the time the request is received;
   forwarding the request to establish two-way video communication to the first selected communication device; and
   in response to the recipient accepting the request, establishing two-way video communication between the caller and the first selected communication device of the recipient.

2. The method of claim 1, further comprising:
   receiving configuration information from a user pertaining to a new communication device associated with the user; and
   adding the configuration information to information pertaining to a set of communication devices associated with the user.

3. The method of 2, wherein configuration information comprises at least one of a name for the communication device, a type of the communication device, and a network address for the device.

4. The method of claim 1, wherein each communication device in the set of communication devices has an associated network address, and wherein forwarding comprises:
   addressing the request to establish two-way video communication to the network address for the first selected communication device; and
   transmitting the request to establish two-way video communication to the first selected communication device.

5. The method of claim 4, wherein the network address comprises one of a uniform resource locator (URL), an Internet protocol (IP) address, a media access control (MAC) address, and a telephone number.

6. The method of claim 1, further comprising:
   in response to the recipient not accepting the request within an established time interval:
      selecting from the set of communication devices a second communication device with a next highest probability of being presently accessible to the recipient after the first selected communication device; and
      forwarding the request to establish two-way video communication to the second selected communication device.

7. The method of claim 1, wherein selecting comprises: selecting from the set of communication devices a communication device to which the recipient is currently logged in such that the recipient is authenticated as a user of the communication device.

8. The method of claim 1, wherein selecting comprises: selecting from the set of communication devices a communication device last accessed by the recipient.

9. The method of claim 1, wherein selecting comprises:
   obtaining schedule data from the recipient's personal information manager identifying probable physical locations of the recipient at various times without requiring the recipient to provide the schedule data specifically for purposes of determining the likelihood of the recipient's presence when routing video calls;
   determining from the schedule a probable physical location of the recipient at the time the request is received; and
   selecting from the set of communication devices a communication device in closest proximity to the probable physical location of the recipient.

10. The method of claim 1, wherein selecting comprises:
    storing historical usage pattern data identifying a plurality of communication devices used by the recipient at a plurality of times in the past; and
    determining from the historical usage pattern data a communication device most likely to be accessible to the recipient at the time the request is received.

11. The method of claim 1, wherein selecting comprises:
    storing user preference data identifying communication devices to be used by the recipient at various times; and
    determining from the user preference data a communication device to be used by the recipient at the time the request is received.

12. The method of claim 1, wherein selecting comprises:
    determining, based on global positioning system (GPS) data obtained from a locator device carried by the recipient, an actual physical location of the recipient at the time the request is received; and
    selecting from the set of communication devices a first communication device in closest proximity to the actual physical location of the recipient, the first communication device being separate from the locator device.

13. The method of claim 1, wherein selecting comprises:
    polling each communication device within the set of communication devices for an indication of the recipient's presence, the indication comprising detection of keystrokes in connection with each communication device.

14. The method of claim 1, wherein selecting comprises:
    receiving an indication of the recipient's presence from a communication device within the set.

15. The method of claim 1, wherein selecting comprises:
    receiving an indication of the recipient's presence sent from a communication device within the set in response to a user command.

16. The method of claim 1, wherein the request to establish two-way communication comprises an address that uniquely identifies the recipient associated with the set of communication devices.

17. A system for routing video calls to a user of multiple communication devices, the system comprising:
    a reception component that receives a request to establish two-way video communication between a caller and a recipient, the request being addressed to the recipient;
    an identification component that identifies the recipient from information contained within the request;
    a determination component that determines a set of communication devices capable of two-way video communication associated with the recipient;
    a selection component that selects from the set of communication devices a first communication device with a highest probability of being accessible to the recipient at the time the request is received;
    a forwarding component that forwards the request to establish two-way video communication to the first selected communication device; and a communication component that establishes communication with the first selected communication device in response to the request to establish two-way communication being accepted by the recipient.

18. The system of claim 17, wherein the selection component is further configured to receive configuration information from a user pertaining to a new communication device associated with the user and add the configuration information to information pertaining to a set of communication devices associated with the user.

19. The system of 18, wherein configuration information comprises at least one of a name for the communication device, a type of the communication device, and a network address for the device.

20. The system of claim 17, wherein each communication device in the set communication devices has an associated network address, and wherein the forwarding component is further configured to address and transmit the request to establish two-way video communication to the network address for the first selected communication device.

21. The system of claim 20, wherein the network address comprises one of a uniform resource locator (URL), an Internet protocol (IP) address, a media access control (MAC) address, and a telephone number.

22. The system of claim 17, wherein the selection component is further configured, in response to the recipient not accepting the request within an established time interval, to select a second communication device with a next highest probability of being presently accessible to the recipient after the first selected communication device; and wherein the forwarding component is further configured to forward the request to establish two-way video communication to the second selected communication device.

23. The system of claim 17, wherein the selection component is further configured to select from the set of communication devices a communication device to which the recipient is currently logged in.

24. The system of claim 17, wherein the selection component is further configured to select from the set of communication devices a communication device last accessed by the recipient.

25. The system of claim 17, wherein the selection component is further configured to obtain schedule data from the recipient's personal information manager identifying probable physical locations of the recipient at various times without requiring the recipient to provide the schedule data specifically for purposes of determining the likelihood of the recipient's presence when routing video calls, determine from the schedule a probable physical location of the recipient at the time the request is received, and select from the set of communication devices a communication device in closest proximity to the probable physical location of the recipient.

26. The system of claim 17, wherein the selection component is further configured to store historical usage pattern data identifying a plurality of communication devices used by the recipient at a plurality of times in the past and to determine from the historical usage pattern data a communication device that is most likely to be accessible to the recipient at the time the request is received.

27. The system of claim 17, wherein the selection component is further configured to store user preference data identifying communication devices to be used by the recipient at various times and to determine from the user preference data a communication device to be used by the recipient at the time the request is received.

28. The system of claim 17, wherein the selection component is further configured to determine, based on global positioning system (GPS) data provided by a locator device carried by the recipient, an actual physical location of the recipient at the time the request is received and to select from the set of communication devices a first communication device in closest proximity to the actual physical location of the recipient, the first communication device being separate from the locator device.

29. The system of claim 17, wherein the selection component is further configured to poll each communication device within the set of communication devices for an indication of the recipient's presence, the indication comprising detection of keystrokes in connection with each communication device.

30. The system of claim 17, wherein the selection component is further configured to receive an indication of the recipient's presence from a communication device within the set of communication devices.

31. The system of claim 17, wherein the selection component is further configured to receive an indication of the recipient's presence sent from a communication device within the set of communication devices in response to a user command.

32. The system of claim 17, wherein the request to establish two-way communication comprises an address that uniquely identifies the recipient associated with the set of communication devices.

33. A system for routing video calls to a user of multiple communication devices, the system comprising:
  means for receiving a request to establish two-way video communication between a caller and a recipient, the request being received at a broadcast center configured to distribute programming content from content providers, the request being addressed to the recipient;
  means for identifying the recipient from information contained within the request;
  means for determining a set of communication devices capable of two-way video communication associated with the recipient;
  means for selecting from the set of communication devices a first communication device with a highest probability of being presently accessible to the recipient at the time the request is received;
  means for forwarding the video communication request from the broadcast center to the first selected communication device; and
  means for establishing two-way video communication between the caller and the first selected communication device of the recipient in response to the recipient accepting the request.

34. A method for routing video calls to a user of multiple communication devices, the method comprising:
  associating a user with a set of communication devices that support two-way video communication;
  storing historical usage pattern data identifying a set of times during which each communication device in the set of communication devices of communication devices is used;
  receiving a request to establish two-way video communication at a first time, the request being addressed to the user;
  comparing the first time with the set of times to determine a first communication device of the set of communication devices with a highest probability of being presently accessible to the user; and
  forwarding the request to establish two-way video communication to the first communication device.

* * * * *